(12) United States Patent
Jia (10) Patent No.: US 9,457,441 B2
(45) Date of Patent: Oct. 4, 2016

(54) CUTTER HOLDING DEVICE OF CUTTING MACHINE

(71) Applicant: Shenzhen China Star Optoelectronics Technology Co., Ltd., Shenzhen, Guangdong (CN)

(72) Inventor: Huping Jia, Guangdong (CN)

(73) Assignees: Shenzhen China Star, Shenzhen (CN); Optoelectronics Technology Co., Ltd, Guangdong (CN)

( * ) Notice: Subject to any disclaimer, the term of this patent is extended or adjusted under 35 U.S.C. 154(b) by 216 days.

(21) Appl. No.: 14/384,648

(22) PCT Filed: Jun. 25, 2013

(86) PCT No.: PCT/CN2013/077932
§ 371 (c)(1),
(2) Date: Sep. 11, 2014

(87) PCT Pub. No.: WO2014/139237
PCT Pub. Date: Sep. 18, 2014

(65) Prior Publication Data
US 2015/0360336 A1  Dec. 17, 2015

(30) Foreign Application Priority Data
Mar. 15, 2013  (CN) .......................... 2013 1 0084059

(51) Int. Cl.
| B23B 31/28 | (2006.01) |
| B23Q 3/15 | (2006.01) |
| B23Q 3/154 | (2006.01) |
| C03B 33/027 | (2006.01) |

(52) U.S. Cl.
CPC ............ B23Q 3/1543 (2013.01); B23B 31/28 (2013.01); C03B 33/027 (2013.01); *Y10T 279/23* (2015.01)

(58) Field of Classification Search
CPC ... B23B 31/28; B23Q 3/1543; C03B 33/027; Y10T 279/23
See application file for complete search history.

(56) References Cited

U.S. PATENT DOCUMENTS

| 1,555,877 A * | 10/1925 | Ripberger ............... B23B 31/28 335/288 |
| 2,824,745 A * | 2/1958 | Ruth ..................... B23B 31/201 279/118 |
| 2,861,224 A * | 11/1958 | Brandenburg .......... B23B 31/28 335/288 |
| 4,449,027 A * | 5/1984 | Fujikawa ................. B23H 7/26 219/69.15 |
| 4,614,137 A * | 9/1986 | Jones ..................... B23B 31/00 279/128 |

(Continued)

FOREIGN PATENT DOCUMENTS

DE            3003990 A  *  8/1981

*Primary Examiner* — Eric A Gates
(74) *Attorney, Agent, or Firm* — Andrew C. Cheng (57) ABSTRACT

A cutter holding device is provided for a cutting machine and includes: a mounting base and a holding member mounted in the mounting base. The mounting base includes a mounting section, iron cores mounted in the mounting section, and a winding wound around an outer circumference of the mounting section. The mounting section includes a mounting trough formed therein. The holding member is mounted in the mounting trough, wherein the iron cores and the winding collectively form first electromagnets, which upon application of electricity thereto, attract and fix the holding member in the mounting trough of the mounting base. The cutter holding device uses magnetic forces applied between the mounting base and the holding member for attraction and fixing so as to easily control fixing and removal of the holding member.

12 Claims, 7 Drawing Sheets

(56) References Cited

U.S. PATENT DOCUMENTS

| | | | |
|---|---|---|---|
| 5,094,134 A | 3/1992 | Mizukoshi | |
| 6,712,367 B1* | 3/2004 | Irion | B23B 31/02 |
| | | | 279/102 |
| 2004/0160020 A1 | 8/2004 | Irion | |
| 2013/0135067 A1* | 5/2013 | Choi | H01F 7/206 |
| | | | 335/290 |

* cited by examiner

CUTTER HOLDING DEVICE OF CUTTING MACHINE

BACKGROUND OF THE INVENTION

1. Field of the Invention

The present invention relates to the field of manufacture of liquid crystal panels, and in particular to a cutter holding device of a cutting machine.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal display panel and a backlight module. The principle of operation of the liquid crystal display panel is that with liquid crystal molecules interposed between two parallel glass substrate, electricity is applied to a circuit of the glass substrates to control the liquid crystal molecules to change direction in order to refract out the light emitting from the backlight module for generation of images.

Figure 1:
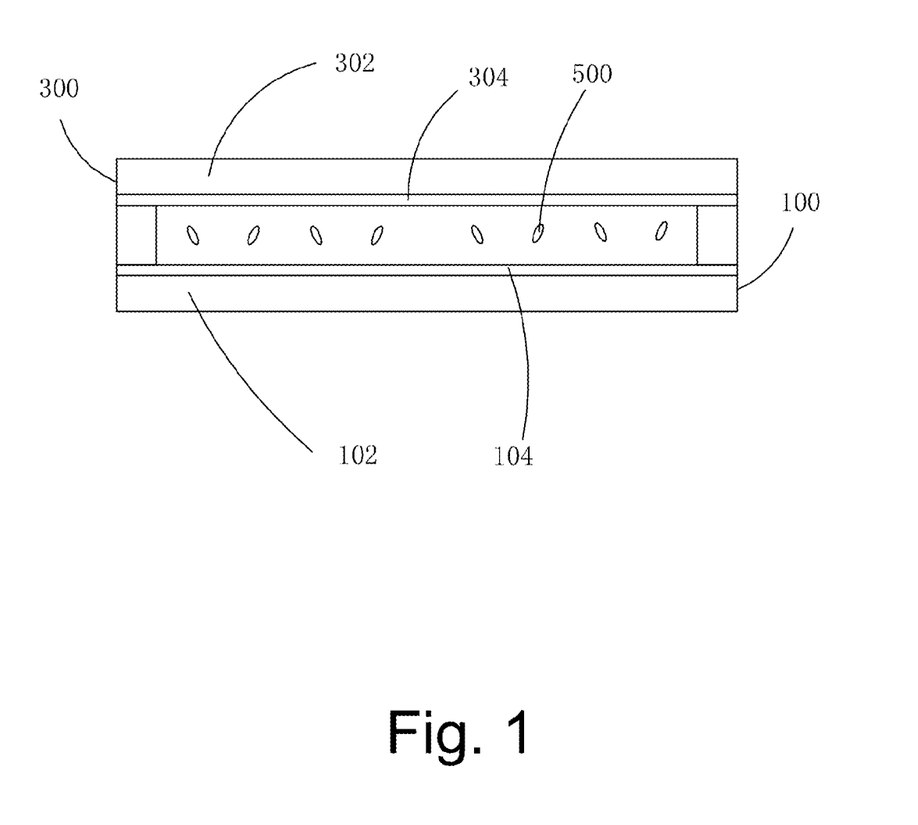
FIG. 1 is a structural schematic view showing a conventional liquid crystal display panel.

As shown in FIG. 1, the liquid crystal display panel generally comprises: a thin-film transistor (TFT) substrate 100, a color filter (CF) substrate 300 bonded to the TFT substrate 100, and liquid crystal 500 arranged between the TFT substrate 100 and the CF substrate 300. The TFT substrate 100 comprises a first glass substrate 102 and a TFT array 104 formed on the first glass substrate 102. The CF substrate 300 comprises a second glass substrate 302 and a color film 304 formed on the second glass substrate 302. In a manufacturing process of the liquid crystal display panel, the first and second glass substrates 102, 302 are made by cutting a large glass panel.

Figure 2:
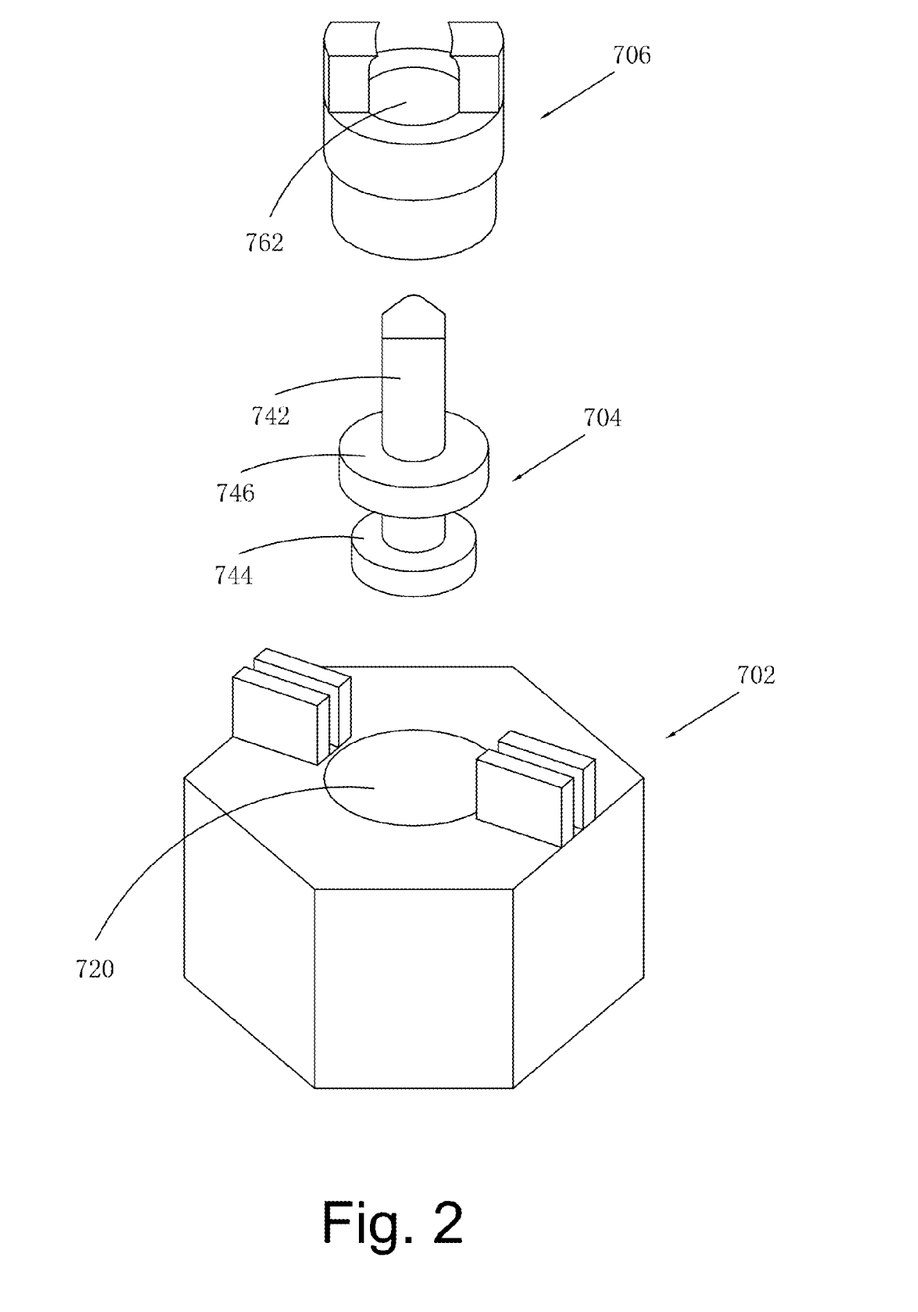
FIG. 2 is an exploded view showing a cutter holding device of a conventional cutting machine.
Figure 3:
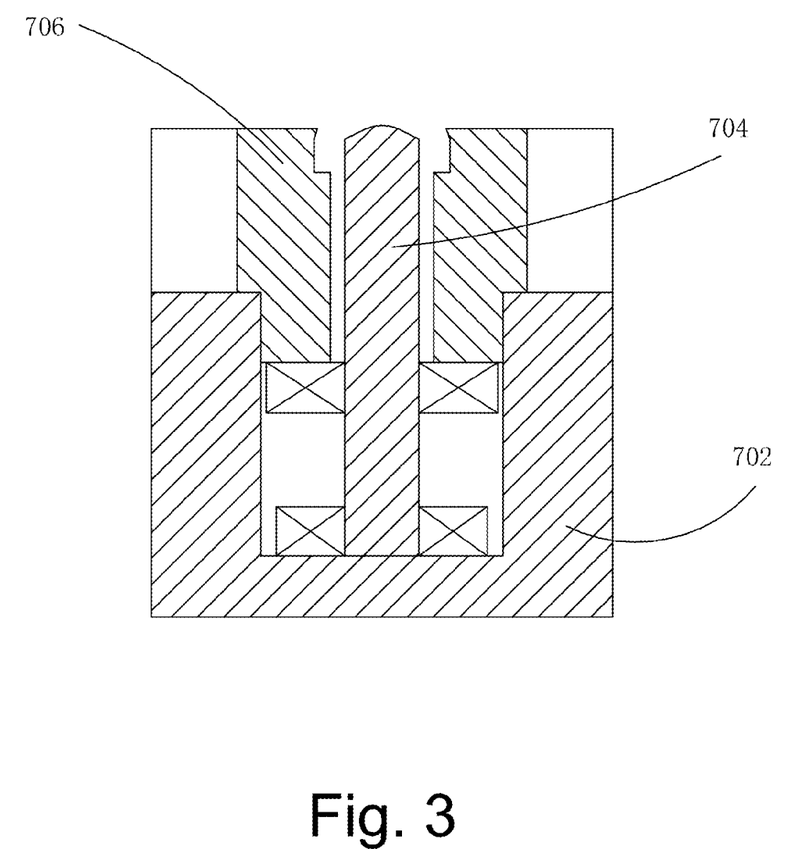
FIG. 3 is a cross-sectional view showing the cutter holding device of the conventional cutting machine in an assembled form.

A large glass panel cutting machine generally comprises: a machine chassis and a holding device mounted on the machine chassis, wherein the holding device holds a cutter. The holding device (as shown in FIGS. 2 and 3) generally comprises: a mounting base 702, a holding member 704 mounted in the mounting base 702, and a fixing block 706 that is mounted in the mounting base 702 to fix the holding member 704. The mounting base 702 comprises a mounting trough 720 formed therein. The holding member 704 and the fixing block 706 are sequentially mounted in the mounting trough 720. The holding member 704 further comprises a holding bar 742, a first bearing 744 mounted to an end of the holding bar 742, and a second bearing 746 mounted to a middle portion of the holding bar 742. The fixing block 706 comprises a through hole 762 formed therein. In assembly, the end of the holding bar 742 that comprises the first bearing 744 mounted thereto is mounted in the mounting trough 720 and then the fixing block 706 is fit over the holding bar 742 from an opposite end thereof and is moved downward into the mounting trough 720 to have the fixing block 706 positioned on the second bearing 746 so as to fix the holding member 704 in the mounting base 702. To disassemble, the fixing block 706 is first lifted upward from the mounting trough 720 and then, the holding member 704 is pulled upward to get out of the mounting trough 720. To facilitate assembling and disassembling of the holding member 704, the conventional holding device is often provided with a gap between the holding member 704 and the mounting trough 720.

However, in cutting a large glass panel, glass chips and particles are generated and may fall into the gap between the holding member 704 and the mounting trough 720, making the holding member 704 stuck in the mounting trough 720 and removal being and even requiring use of pliers. The pliers used in the process of removal may readily damage the mounting trough 720, making the mounting trough 720 deformed and incapable of effectively fixing the holding member 704, thereby leading to cutting abnormality and increase of manufacturing cost.

SUMMARY OF THE INVENTION

An object of the present invention is to provide a cutter holding device of a cutting machine, which adopts electromagnetic attraction to achieve fixing and thus has a simple structure, is easy to assemble and disassemble, and can effectively lower down manufacturing costs.

To achieve the above object, the present invention provides a cutter holding device of a cutting machine, which comprises: a mounting base and a holding member mounted in the mounting base. The mounting base comprises a mounting section, iron cores mounted in the mounting section, and a winding wound around an outer circumference of the mounting section. The mounting section comprises a mounting trough formed therein. The holding member is mounted in the mounting trough, wherein the iron cores and the winding collectively form first electromagnets, which upon application of electricity thereto, attract and fix the holding member in the mounting trough of the mounting base.

The mounting base further comprises a bottom seat mounted at one end of the mounting trough of the mounting section. The winding and the bottom seat collectively form a second electromagnet, wherein the second electromagnet, upon application of electricity thereto, further attracts and fixes the holding member in the mounting trough of the mounting base.

The mounting section comprises a recess formed therein to correspond to an end of the mounting trough and in communication with the mounting trough. The bottom seat is received in the recess.

The mounting section comprises first and second receiving compartments formed therein to respectively correspond to two ends of the mounting trough and the first receiving compartment is in communication with the recess. The iron cores are respectively mounted in the first and second receiving compartments.

The mounting trough is in the form of a cylinder and the first and second receiving compartments are of an annular form. Two iron cores are provided and each in the form of a ring. The bottom seat has a circular cross-section.

The mounting section is in the form of a cylinder and the winding is wound around an outer surface of the mounting section.

The iron cores and the bottom seat are each made of iron or silicon steel.

The mounting base further comprises a sleeve and a bottom lid. The mounting section is received in the sleeve. The bottom lid is set to cover a bottom of the bottom seat. The sleeve comprises wire passages formed therein to correspond to two ends of the winding.

The holding member comprises a holding bar, a first bearing mounted to an end of the holding bar, and a second bearing mounted to a middle portion of the holding bar, whereby when the holding member is mounted in the mounting base, the first receiving compartment surrounds an outer surface of the first bearing and the second receiving compartment surrounds an outer surface of the second bearing with an end of the holding bar being positioned against the bottom seat.

The first and second bearings have an outside diameter that is smaller than an inside diameter of the mounting trough.

The present invention also provides a cutter holding device of a cutting machine, which comprises: a mounting base and a holding member mounted in the mounting base, the mounting base comprising a mounting section, iron cores mounted in the mounting section, and a winding wound around an outer circumference of the mounting section, the mounting section comprising a mounting trough formed therein, the holding member being mounted in the mounting trough, wherein the iron cores and the winding collectively form first electromagnets, which upon application of electricity thereto, attract and fix the holding member in the mounting trough of the mounting base;

wherein the mounting base further comprises a bottom seat mounted at one end of the mounting trough of the mounting section, the winding and the bottom seat collectively forming a second electromagnet, wherein the second electromagnet, upon application of electricity thereto, further attracts and fixes the holding member in the mounting trough of the mounting base;

wherein the mounting section comprises a recess formed therein to correspond to an end of the mounting trough and in communication with the mounting trough, the bottom seat being received in the recess;

wherein the mounting section comprises first and second receiving compartments formed therein to respectively correspond to two ends of the mounting trough and the first receiving compartment is in communication with the recess, the iron cores being respectively mounted in the first and second receiving compartments;

wherein the mounting trough is in the form of a cylinder and the first and second receiving compartments are of an annular form, two iron cores being provided and each in the form of a ring, the bottom seat having a circular cross-section;

wherein the mounting section is in the form of a cylinder and the winding is wound around an outer surface of the mounting section;

wherein the iron cores and the bottom seat are each made of iron or silicon steel;

wherein the mounting base further comprises a sleeve and a bottom lid, the mounting section being received in the sleeve, the bottom lid being set to cover a bottom of the bottom seat, the sleeve comprising wire passages formed therein to correspond to two ends of the winding;

wherein the holding member comprises a holding bar, a first bearing mounted to an end of the holding bar, and a second bearing mounted to a middle portion of the holding bar, whereby when the holding member is mounted in the mounting base, the first receiving compartment surrounds an outer surface of the first bearing and the second receiving compartment surrounds an outer surface of the second bearing with an end of the holding bar being positioned against the bottom seat; and wherein the first and second bearings have an outside diameter that is smaller than an inside diameter of the mounting trough.

The efficacy of the present invention is that the present invention provides a cutter holding device of a cutting machine, which comprises iron cores mounted in a mounting section of a mounting base and a winding wound around an outer circumference of the mounting section so that the iron cores that are mounted in a wall of a mounting trough of the mounting section and the winding collectively form first electromagnets to allow the first electromagnets to apply attraction to outer surfaces of first and second bearings of a holding member and additionally comprises a bottom seat, where the bottom seat of the mounting base and the winding collectively form a second electromagnet that attracts a bottom of the first bearing of the holding member to securely fix the holding member in the mounting trough, wherein when it needs to remove the holding member, electricity supplied to the winding is cut off so that the magnetic attraction forces that the first and second electromagnets apply to the holding member vanish to allow for easy removal of the holding member, the operation being simple. Further, the cutter holding device of the cutting machine of the present invention uses magnetic forces applied between the mounting base and the holding member for attraction and fixing so that there is no need of mechanical retention. A gap between the first and second bearings of the holding member and an inside surface of the mounting trough is made slightly large to prevent the holding member from being stuck in the mounting trough by glass chips and particles falling into the gap between the first and second bearings of the holding member and the inside surface of the mounting trough, and thus being hard to remove.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIGS. 4-7, the present invention provides a cutter holding device of a cutting machine, which comprises: a mounting base 2 and a holding member 4 mounted in the mounting base 2. The mounting base 2 comprises a mounting section 22, iron cores 24 mounted in the mounting section 22, and a winding 26 wound around an outer circumference of the mounting section 22. The mounting section 22 is in the form of a cylinder and the winding 26 is wound around an outer surface of the mounting section 22. The mounting section 22 comprises a mounting trough 222 formed therein and the holding member 4 is mounted in the mounting trough 222. With the iron cores 24 and the winding 26 collectively forming first electromagnets 246, upon application of electricity, the first electromagnets 246 generate magnetic attraction forces to attract and fix the holding member 4 in the mounting trough 222 of the mounting base 2; and when it needs to remove the holding member 4 from the mounting base 2, electricity supplied to the first electromagnets 246 is cut off, the operation being simple and easy.

The mounting base 2 further comprises a bottom seat 28 arranged at one end of the mounting trough 222 of the mounting section 22. The bottom seat 28 has a circular cross-section. The winding 26 and the bottom seat 28 collectively form a second electromagnet 268. Upon application of electricity, the second electromagnet 268 generates a magnetic attraction force to further attract and fix the holding member 4 in the mounting trough 222 of the mounting base 2.

Preferably, the mounting section 22 comprises a recess 224 formed therein to correspond, in position, to an end of the mounting trough 222 and communicate with the mounting trough 222. The bottom seat 28 is received and retained in the recess 224. Since the iron cores 24 and the bottom seat 28 are both disposed inside the mounting section 22, having a winding 26 wound around the outer circumference of the mounting section 22 forms simultaneously the first electromagnets 246 (composed of the winding 26 and the iron cores 24) and the second electromagnet 268 (composed of the winding 26 and the bottom seat 28) and the operation of winding the winding 28 around the outer circumference of the mounting section 22 is relatively simple, making the manufacturing easy and achievable with a low cost. Further, supplying ad cutting of electricity to the winding 26 can be carried out simultaneously so as to have the first electromagnets 246 and the second electromagnet 268 simultaneously generate magnetic attraction forces or simultaneously remove the magnetic attraction forces to facilitate mounting and removing of the holding member 4. In the instant embodiment, the iron cores 24 and the bottom seat 28 are each made of iron or silicon steel and are preferably made of silicon steel of easy magnetization and demagnetization, so that the magnetic attraction forces applied by the first and second electromagnets 246, 268 to the holding member 4 can be timely supplied and removed, allowing the holding member 4 to be timely fixed and removed.

Further, the mounting section 22 comprises first and second receiving compartments 226, 228 formed therein to respectively correspond, in position, to two ends of the mounting trough 222 and the first receiving compartment 226 is in communication with the recess 224. In the instant embodiment, the mounting trough 222 is of a cylindrical form and the first and second receiving compartments 226, 228 are of an annular form surrounding an outer circumference of the mounting trough 222. The number of the iron cores 24 is two, which are both in the form of a ring. The two iron cores 24 are respectively mounted in the first and second receiving compartments 226, 228. To assemble, one of the iron cores 24 is disposed in the first receiving compartment 226 first and then, the bottom seat 28 is set in the recess 224 so that the bottom seat 28 retains the iron core 24 in the first receiving compartment 226.

Figure 4:
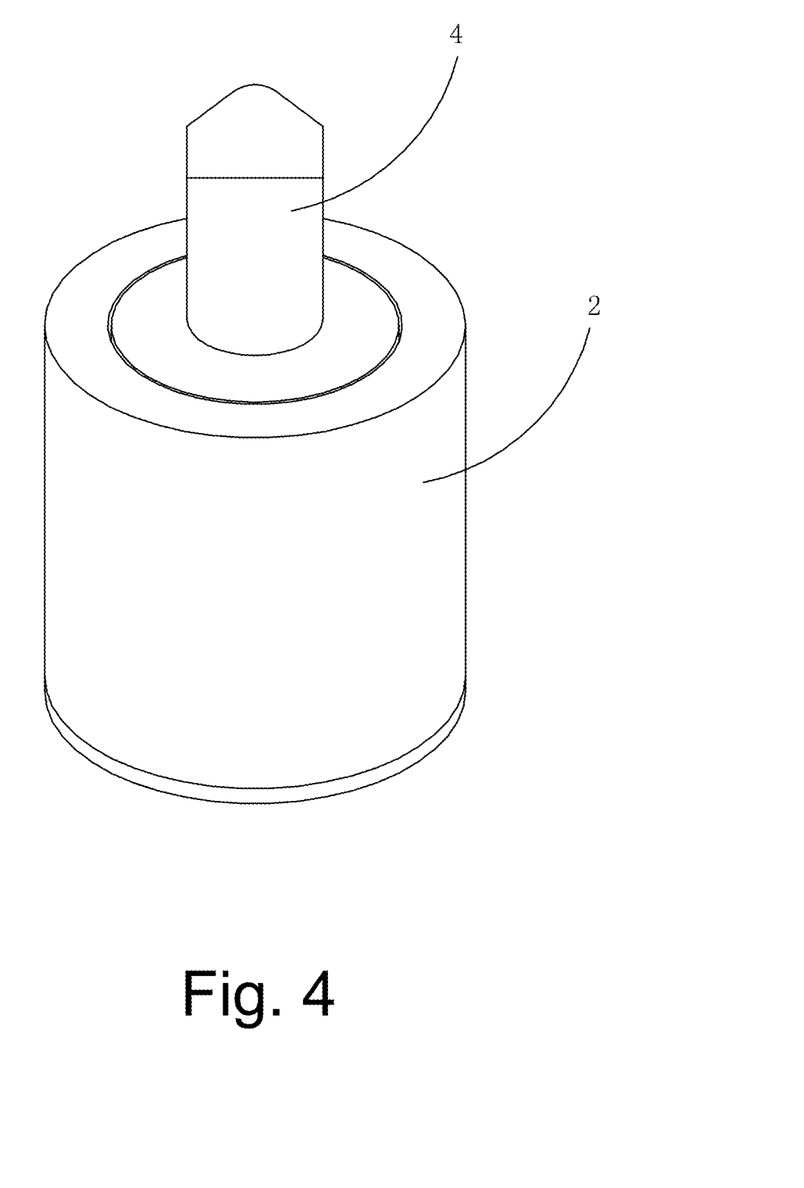
FIG. 4 is a perspective view showing a cutter holding device of a cutting machine according to the present invention in an assembled form.
Figure 5:
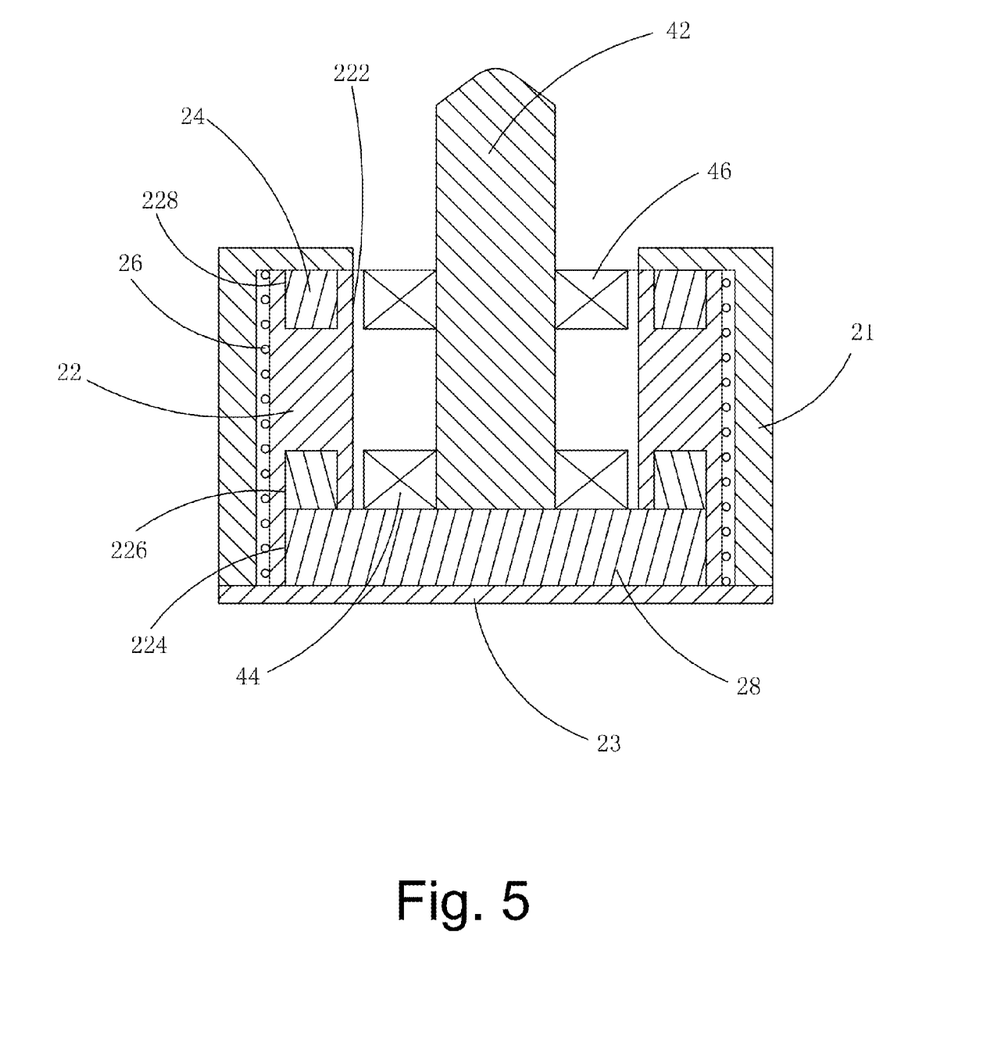
FIG. 5 is a cross-sectional view showing the cutter holding device of the cutting machine according to the present invention in an assembled form.

The mounting base 2 further comprises a sleeve 21 and a bottom lid 23. The mounting section 22 is received in the sleeve 21 and the bottom lid 23 is set under and covers the underside of the bottom seat 28. The sleeve 21 is fit over and protects the winding 26. The sleeve 21 is provided with wire passages (not shown) formed therein to correspond to the two ends of the winding 26 to allow the winding 26 to connect to an external circuit. The bottom lid 23 and the sleeve 21 collectively form a housing that provides complete protection of interior components of the mounting base 2 and provide a unitary outside appearance of the mounting base 2 to facilitate storage, shipping, installation, and removal.

Figure 6:
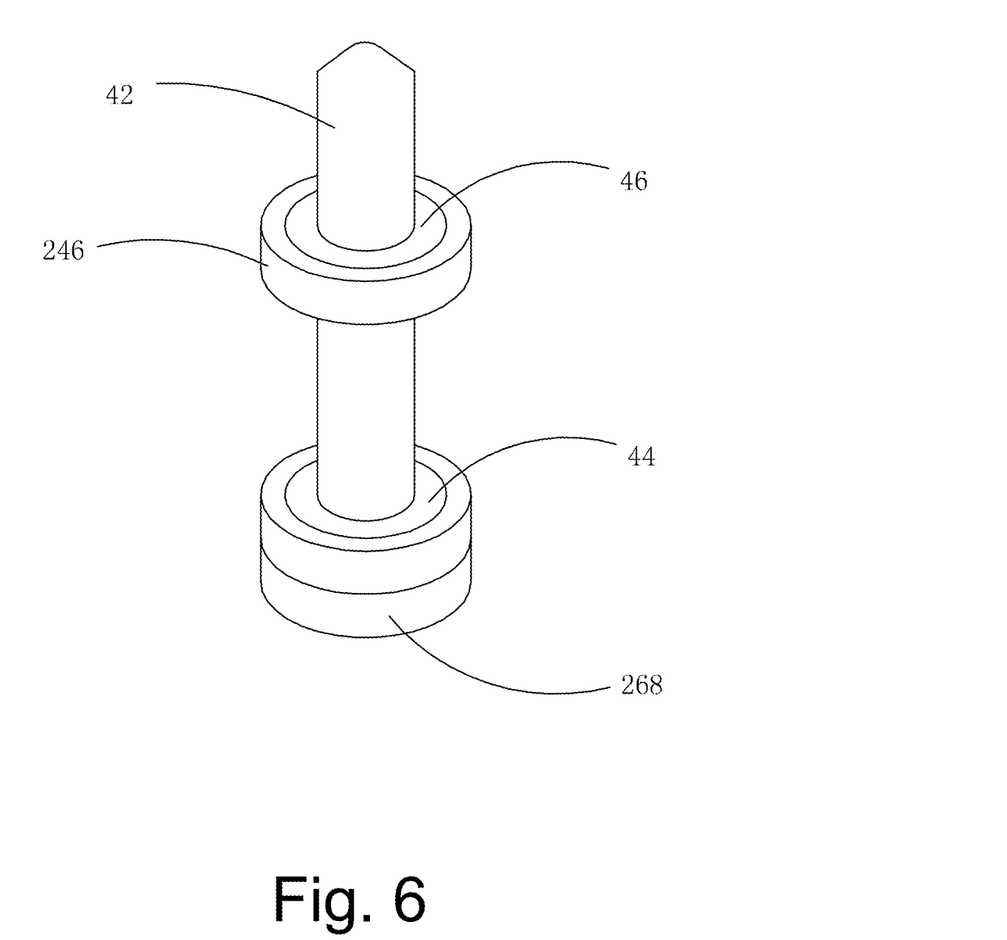
FIG. 6 is a schematic view illustrating the operation principle of an electromagnet of the cutter holding device of the cutting machine of the present invention attracting a holding member.

The holding member 4 comprises a holding bar 42, a first bearing 44 mounted to an end of the holding bar 42, and a second bearing 46 mounted to a middle portion of the holding bar 42. When the holding member 4 is mounted in the mounting base 2, the first receiving compartment 226 surrounds the outer surface of the first bearing 44 and the second receiving compartment 228 surrounds an outer surface of the second bearing 46 with an end of the holding bar 42 positioned against the bottom seat 28. When electricity is supplied to the winding 26, the iron cores 24 that are mounted in the first and second receiving compartments 226, 228 and the winding 26 collectively form two first electromagnets 246 that respectively apply magnetic attraction forces to the outer surfaces of the first and second bearings 44, 46. Since the first electromagnets 246 are each in the form of a ring, the magnetic attraction forces applied to the outer surfaces of the first and second bearings 44, 46 are substantially identical, thereby ensuring steadiness of the holding member 4. Further, the magnetic attraction force that the second electromagnet 268 applies to a bottom of the first bearing 44 and a bottom of the holding bar 42 further ensures steadiness and fixing of the holding member 4.

In the instant embodiment, the first and second bearings 44, 46 are arranged to have outside diameters that are slightly smaller than an inside diameter of the mounting trough 222 so that when the holding member 4 is mounted in the mounting trough 222, a slightly large gap is formed between the first and second bearings 44, 46 and an side surface of the mounting trough 222 to prevent glass chips and particles that fall between the first and second bearings 44, 46 of holding member 4 and the inside surface of the mounting trough 222 from making the holding member 4 stuck in the mounting trough 222 and being hard to remove the holding member 4 out of the mounting trough 222, whereby it is possible to avoid damaging the mounting trough 222 or the holding member 4 with the use of an external tool (such as pliers) for forcibly removing the holding member 4 out of the mounting trough 222 so as to effectively lower down the cost.

Figure 7:
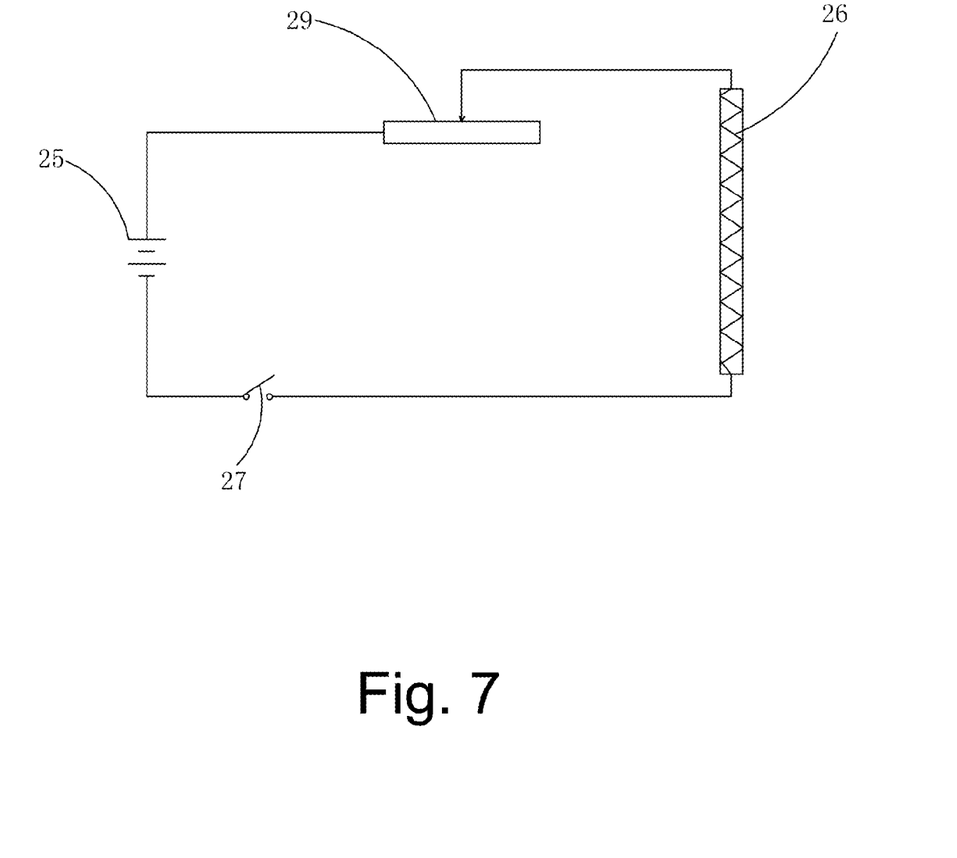
FIG. 7 is a circuit diagram of the cutter holding device of the cutting machine of the present invention.

It is noted here that the mounting base 2 may further comprise a power supply device 25 and a switch element 27. The power supply device 25 is electrically connected to the winding 26 to form an external power supply circuit that supplies electricity to the winding 26. The switch element 27 is arranged in the circuit for controlling supply and interruption of electricity supplied from the power supply device 25 to the winding 26, thereby controlling the first and second electromagnets 246, 268 to attract and fix or to release and free the holding member 4 for removal. In the instant embodiment, the power supply device 25 comprises a direct-current power supply.

Preferably, the mounting base 2 further comprises a varistor 29, which is electrically connected to the external power supply circuit to regulate the magnitude of the electrical current flowing through the winding 26 thereby adjusting the magnitude of the magnetic forces of the first and second electromagnets 246, 268 to adjust the magnetic attraction applied to the holding member 4 for more securely fixing the holding member 4. In the instant embodiment, the varistor 29 is a slide varistor.

In summary, the present invention provides a cutter holding device of a cutting machine, which comprises iron cores mounted in a mounting section of a mounting base and a winding wound around an outer circumference of the mounting section so that the iron cores that are mounted in a wall of a mounting trough of the mounting section and the winding collectively form first electromagnets to allow the first electromagnets to apply attraction to outer surfaces of first and second bearings of a holding member and additionally comprises a bottom seat, where the bottom seat of the mounting base and the winding collectively form a second electromagnet that attracts a bottom of the first bearing of the holding member to securely fix the holding member in the mounting trough, wherein when it needs to remove the holding member, electricity supplied to the winding is cut off so that the magnetic attraction forces that the first and second electromagnets apply to the holding member vanish to allow for easy removal of the holding member, the operation being simple. Further, the cutter holding device of the cutting machine of the present invention uses magnetic forces applied between the mounting base and the holding member for attraction and fixing so that there is no need of mechanical retention. A gap between the first and second bearings of the holding member and an inside surface of the mounting trough is made slightly large to prevent the holding member from being stuck in the mounting trough by glass chips and particles falling into the gap between the first and second bearings of the holding member and the inside surface of the mounting trough, and thus being hard to remove.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A cutter holding device of a cutting machine, comprising: a mounting base and a holding member mounted in the mounting base, the mounting base comprising a mounting section, iron cores mounted in the mounting section, and a winding wound around an outer circumference of the mounting section, the mounting section comprising a mounting trough formed therein, the holding member being mounted in the mounting trough, wherein the iron cores and the winding collectively form first electromagnets, which upon application of electricity thereto, attract and fix the holding member in the mounting trough of the mounting base;

wherein the mounting base further comprises a bottom seat mounted at one end of the mounting trough of the mounting section, the winding and the bottom seat collectively forming a second electromagnet, wherein the second electromagnet, upon application of electricity thereto, further attracts and fixes the holding member in the mounting trough of the mounting base; and wherein the mounting base further comprises a sleeve and a bottom lid, the mounting section being received in the sleeve, the bottom lid being set to cover a bottom of the bottom seat, the sleeve comprising wire passages formed therein to correspond to two ends of the winding.

2. The cutter holding device of the cutting machine as claimed in claim 1, wherein the mounting section comprises a recess formed therein to correspond to an end of the mounting trough and in communication with the mounting trough, the bottom seat being received in the recess.

3. The cutter holding device of the cutting machine as claimed in claim 2, wherein the mounting section comprises first and second receiving compartments formed therein to respectively correspond to two ends of the mounting trough and the first receiving compartment is in communication with the recess, the iron cores being respectively mounted in the first and second receiving compartments.

4. The cutter holding device of the cutting machine as claimed in claim 3, wherein the mounting trough is in the form of a cylinder and the first and second receiving compartments are of an annular form, two iron cores being provided and each in the form of a ring, the bottom seat having a circular cross-section.

5. The cutter holding device of the cutting machine as claimed in claim 4, wherein the mounting section is in the form of a cylinder and the winding is wound around an outer surface of the mounting section.

6. The cutter holding device of the cutting machine as claimed in claim 3, wherein the iron cores and the bottom seat are each made of iron or silicon steel.

7. A cutter holding device of a cutting machine, comprising: a mounting base and a holding member mounted in the mounting base, the mounting base comprising a mounting section, iron cores mounted in the mounting section, and a winding wound around an outer circumference of the mounting section, the mounting section comprising a mounting trough formed therein, the holding member being mounted in the mounting trough, wherein the iron cores and the winding collectively form first electromagnets, which upon application of electricity thereto, attract and fix the holding member in the mounting trough of the mounting base;

wherein the mounting base further comprises a bottom seat mounted at one end of the mounting trough of the mounting section, the winding and the bottom seat collectively forming a second electromagnet, wherein the second electromagnet, upon application of electricity thereto, further attracts and fixes the holding member in the mounting trough of the mounting base;

wherein the mounting section comprises a recess formed therein to correspond to an end of the mounting trough and in communication with the mounting trough, the bottom seat being received in the recess;

wherein the mounting section comprises first and second receiving compartments formed therein to respectively correspond to two ends of the mounting trough and the first receiving compartment is in communication with the recess, the iron cores being respectively mounted in the first and second receiving compartments;

wherein the mounting trough is in the form of a cylinder and the first and second receiving compartments are of an annular form, two iron cores being provided and each in the form of a ring, the bottom seat having a circular cross-section;

wherein the mounting section is in the form of a cylinder and the winding is wound around an outer surface of the mounting section;

wherein the iron cores and the bottom seat are each made of iron or silicon steel;

wherein the mounting base further comprises a sleeve and a bottom lid, the mounting section being received in the sleeve, the bottom lid being set to cover a bottom of the bottom seat, the sleeve comprising wire passages formed therein to correspond to two ends of the winding;

wherein the holding member comprises a holding bar, a first bearing mounted to an end of the holding bar, and a second bearing mounted to a middle portion of the holding bar, whereby when the holding member is mounted in the mounting base, the first receiving compartment surrounds an outer surface of the first bearing and the second receiving compartment surrounds an outer surface of the second bearing with an end of the holding bar being positioned against the bottom seat; and wherein the first and second bearings have an outside diameter that is smaller than an inside diameter of the mounting trough.

8. A cutter holding device of a cutting machine, comprising: a mounting base and a holding member mounted in the mounting base, the mounting base comprising a mounting section, iron cores mounted in the mounting section, and a winding wound around an outer circumference of the mounting section, the mounting section comprising a mounting trough formed therein, the holding member being mounted in the mounting trough, wherein the iron cores and the winding collectively form first electromagnets, which upon application of electricity thereto, attract and fix the holding member in the mounting trough of the mounting base;

wherein the mounting base further comprises a bottom seat mounted at one end of the mounting trough of the mounting section, the winding and the bottom seat collectively forming a second electromagnet, wherein the second electromagnet, upon application of electricity thereto, further attracts and fixes the holding member in the mounting trough of the mounting base;

wherein the mounting section comprises a recess formed therein to correspond to an end of the mounting trough and in communication with the mounting trough, the bottom seat being received in the recess;

wherein the mounting section comprises first and second receiving compartments formed therein to respectively correspond to two ends of the mounting trough and the first receiving compartment is in communication with the recess, the iron cores being respectively mounted in the first and second receiving compartments; and wherein the holding member comprises a holding bar, a first bearing mounted to an end of the holding bar, and a second bearing mounted to a middle portion of the holding bar, whereby when the holding member is mounted in the mounting base, the first receiving compartment surrounds an outer surface of the first bearing and the second receiving compartment surrounds an outer surface of the second bearing with an end of the holding bar being positioned against the bottom seat.

9. The cutter holding device of the cutting machine as claimed in claim 8, wherein the first and second bearings have an outside diameter that is smaller than an inside diameter of the mounting trough.

10. The cutter holding device of the cutting machine as claimed in claim 8, wherein the mounting trough is in the form of a cylinder and the first and second receiving compartments are of an annular form, two iron cores being provided and each in the form of a ring, the bottom seat having a circular cross-section.

11. The cutter holding device of the cutting machine as claimed in claim 10, wherein the mounting section is in the form of a cylinder and the winding is wound around an outer surface of the mounting section.

12. The cutter holding device of the cutting machine as claimed in claim 8, wherein the iron cores and the bottom seat are each made of iron or silicon steel.

* * * * *